United States Patent [19]

Matsuo et al.

[11] Patent Number: 4,640,974

[45] Date of Patent: Feb. 3, 1987

[54] POLYCYANOARYL ETHER FILMS AND FIBERS

[75] Inventors: Shigeru Matsuo; Tomoyoshi Murakami, both of Sodegaura, Japan

[73] Assignee: Idemitsu Kosan Company Limited, Tokyo, Japan

[21] Appl. No.: 830,652

[22] Filed: Feb. 18, 1986

[30] Foreign Application Priority Data

Feb. 22, 1985 [JP] Japan .................. 60-32740
Apr. 5, 1985 [JP] Japan .................. 60-71209
Apr. 17, 1985 [JP] Japan .................. 60-80404
Apr. 23, 1985 [JP] Japan .................. 60-85437

[51] Int. Cl.$^4$ ............................................ C08G 67/00
[52] U.S. Cl. .................................. 528/211; 528/125; 528/173; 528/174; 528/219; 264/210.1; 264/331.11

[58] Field of Search ............... 528/211, 125, 173, 174, 528/219

[56] References Cited

U.S. PATENT DOCUMENTS 3,730,946 5/1973 Heath et al. .................. 528/184

FOREIGN PATENT DOCUMENTS 0163924 8/1985 Japan .................. 528/211

Primary Examiner—Harold D. Anderson
Attorney, Agent, or Firm—Frishauf, Holtz, Goodman & Woodward

[57] ABSTRACT

Polycyanoaryl ether stretched films and fibers prepared from polycyanoaryl ethers containing specific repeating units and number-average molecular weights or reduced viscosities by stretching molded films or melt-spun fibers, said films and fibers having superior heat resistance and mechanical strength.

15 Claims, No Drawings

POLYCYANOARYL ETHER FILMS AND FIBERS

BACKGROUND TO THE INVENTION

This invention relates to a polycyanoaryl ether stretched or oriented film or fiber having superior heat resistance and mechanical strength.

For electrical and electronic equipments, there have been widely employed films of those resins having superior heat resistance, mechanical strength or electric properties. Recently, as such equipments have been much more miniaturized and lightened, there is a need for more superior heat resistance and mechanical strength on the film materials to be applied. In order to meet such a need, stretched films of, e.g., aromatic polyesters have been hitherto employed in the art. However, such aromatic polyester oriented films would not be said to fully satisfy the above-depicted need as industrial films. Therefore, there is a need for a film with far higher heat resistance and mechanical strength.

On the other hand, as application of various plastic materials has been recently broadened, there has become more serve a demand for properties of such materials, e.g., heat resistance or mechanical strength. Thus, it has been generally done to add a reinforcing fiber into plastic materials for providing a higher mechanical strength. As the reinforcing fiber, there have been employed a wide variety of fibers composed of, e.g., any inorganic material or synthetic resin. However, those inorganic fibers are difficult to be produced in a large scale and at a low cost owing to many steps required for the manufacture thereof, while those synthetic resin fibers present the problem that heat resistance and mechanical strength of the fiber itself are not necessarily satisfactory, though manufactured readily. Therefore, there is also a need for a reinforcing fiber composed of a synthetic resin with far higher heat resistance and mechanical strength.

BRIEF SUMMARY OF THE INVENTION

For meeting the aforesaid need in the art, this invention provides a stretched film and a reinforcing fiber with superior heat resistance and mechanical strength, which can be made of a polycyanoaryl ether having specific chemical structure and properties.

Therefore, it is an object of this invention to provide an orientad film of a polycyanoaryl ether having specific structure and properties, which is superior in heat resistance and mechanical strength.

Another object of this invention is to provide a reinforcing fiber of a polycyanoaryl ether having specific structure and properties with higher heat resistance and mechanical strength.

DETAILED DESCRIPTION OF THE INVENTION

The polycyanoaryl ether stretched film of this invention is a molded film being composed of (A) a polycyanoaryl ether containing not less than 80 molar % of a repeating unit represented by the formula

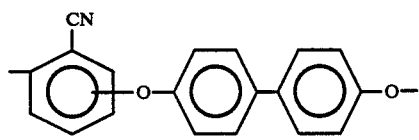 (I)

and having a number-average molecular weight of 25,000–65,000, (B) a polycyanoaryl ether containing not less than 50 molar % of a repeating unit represented by the formula

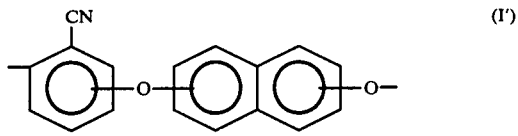 (I')

and having a reduced viscosity [η sp/c] of 0.4–2.0 dl/g in its 0.2g/dl solution in p-chlorophenol at 60° C. or (C) a polycyanoaryl ether containing not less than 80 molar % of a repeating unit represented by the formula

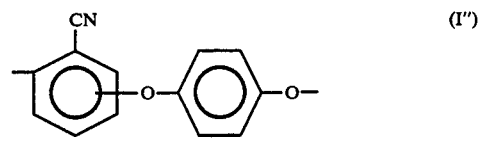 (I")

and having a number-average molecular weight of 30,000–90,000, and having been stretched with a drawing ratio of not less than 1.5 times.

The polycyanoaryl ether (A), which may be employed as a film material in this invention, contains the repeating units represented by the above formula (I) and is blocked with a terminal group selected from the group of —H, —X,

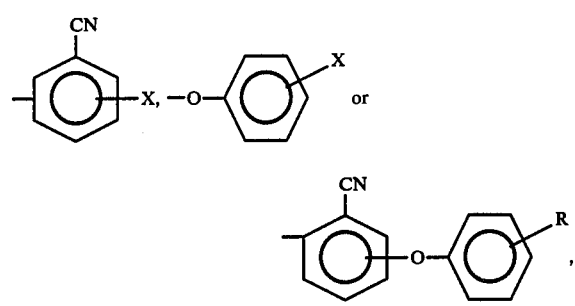

wherein X is a halogen atom, R is a hydrogen atom, a nitrile group, an alkyl group having 1 to 10 carbon atoms, an aryl group or an aralkyl group.

The polycyanoaryl ether (A) should essentially contain not less than 80 molar % of the repeating unit (I), preferably 90–100 molar %. If the content is less than 80 molar %, crystallizability of the polymer unfavourably tend to be damaged. The polycyanoaryl ether (A) may be a copolymer containing the repeating unit (I) and further not more than 20 molar % of a repeating unit of the formula

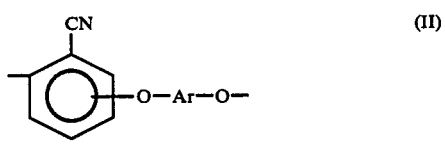 (II)

wherein Ar is a divalent aryl group other than

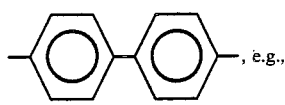, e.g.,

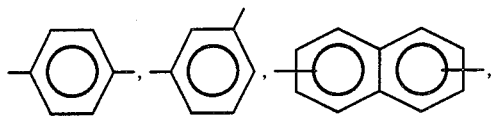

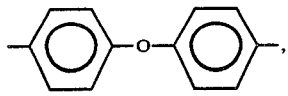

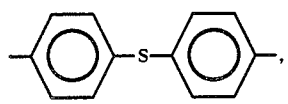

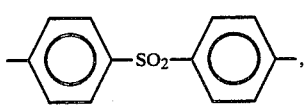

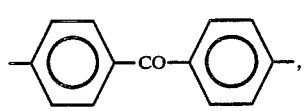

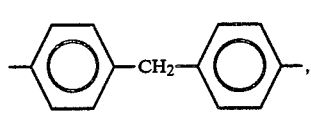

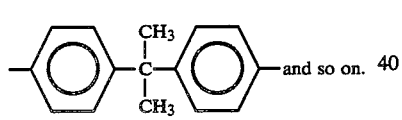 and so on.

If the repeating unit (II) is involved at more than 20 molar %, the resultant molded film tends to lose its crystallizability and thus a satisfactory orientation effect would not be expected.

Additionally, the polycyanoaryl ether (A) should essentially have a number-average molecular weight of 25,000 to 65,000, preferably 35,000 to 60,000. If the number-average molecular weight is less than 25,000, a molded film becomes brittle and difficult to be stretched. If the number-average molecular weight is more than 65,000, extrusion molding becomes difficult and film-forming could not be constantly effected to make stretching more difficult. Moreover, as the molecular weight is more increased, film-forming itself unfavourably becomes infeasible.

The polycyanoaryl ether (A) may be readily prepared according to a conventional method, typically by reacting a dihalogenobenzonitrile with an alkali metal salt of a biphenol and, where necessary, an alkali metal salt of any other dihydric phenol in the presence of a suitable solvent. In this reaction, there may be employed as a molecular weight modifier any of those compounds of the formula

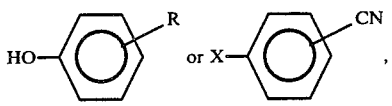

wherein R and X are as defined above.

The polycyanoaryl ether (B), which may be also employed as a film material in this invention, should contain not less than 50 molar % of the repeating unit (I'), preferably 80–100 molar %. If the content is less than 50 molar %, both heat resistance and mechanical strength tend to be lowered.

The polycyanoaryl ether (B) may be a copolymer containing the repeating unit (I') and further less than 50 molar % of at least one of the repeating units represented by the formula

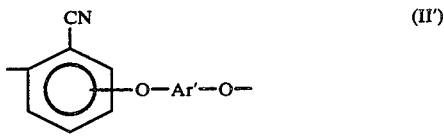 (II')

wherein Ar' is a divalent aryl group other than

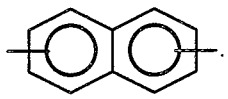.

As examples of the Ar', there may be mentioned, for instance,

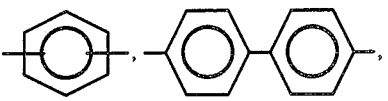

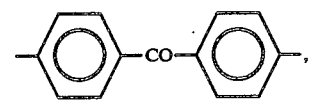

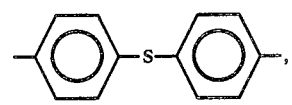

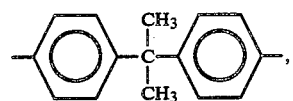

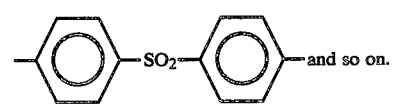 and so on.

The polycyanoaryl ether (B) should have a molecular weight corresponding to a reduced viscosity [η sp/c] of 0.4–2.0 dl/g, preferably 0.6–1.5 dl/g, as measured at 60° C. when the ether is dissolved in p-chlorophenol at a concentration of 0.2 g/dl. If the reduced viscosity is less than 0.4 dl/g, both heat resistance and mechanical strength are insufficient, while such a polymer is melt-molded to a film to produce a brittle molded film, which is difficult to be stretched as disclosed below. If the reduced viscosity is more than 2.0 dl/g, film-forming becomes difficult and a uniform film could not be prepared.

Modification of a molecular weight or reduced viscosity may be conducted by setting reaction parameters including temperature and period in the polymerization reaction to given figures or by adding a given amount of a molecular weight modifier. As the molecular weight modifiers which may be employed in the latter case, there may be desirably employed

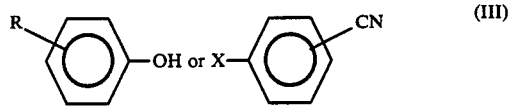 (III)

wherein R and X are as defined above.

In the polycyanoaryl ether (B), the repeating units (I') may be located straight or the both repeating units (I') and (II') may be located randomly or regularly straight in combination therewith and a terminal group thereof is blocked by, e.g.,

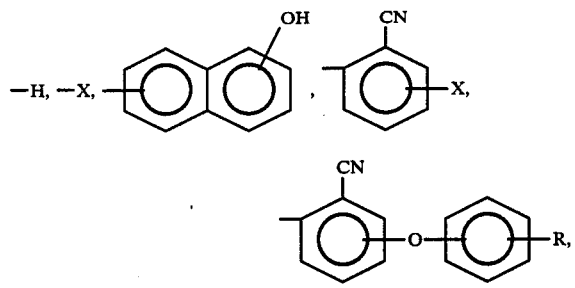

wherein R and X are as defined above.

The polycyanoaryl ether (B) may be readily prepared according to a conventional method, for instance, by reacting a dihalogenobenzonitrile with an alkali metal salt of a dihydroxynaphthalene having the formula

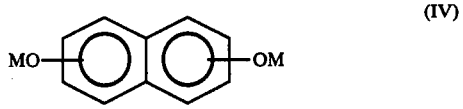 (IV)

wherein M is an alkali metal and, where necessary, an alkali metal salt of any other dihydric phenol in the presence of a suitable solvent and then treating with water or an alcohol. As examples of the compound (IV), there may be mentioned, e.g., an alkali metal salt of 1,5-dihydroxynaphthalene, 1,6-dihydroxynaphthalene or 2,7-dihydroxynaphthalene and one or more of the compounds (IV) may be optionally applied to the reaction.

Additionally, the polycyanoaryl ether (C) should essentially have a number-average molecular weight of 30,000–90,000, preferably 35,000 to 60,000. If the number-average molecular weight is less than 30,000, a molded film becomes brittle and difficult to be stretched. If the number-average molecular weight is more than 90,000, extrusion molding becomes difficult and film-forming could not be constantly effected to make stretching more difficult. Moreover, as the molecular weight is more increased, film-forming itself unfavourably becomes infeasible.

The polycyanoaryl ether (C) may be readily prepared according to a conventional method, typically by reacting a dihalogenobenzonitrile with an alkali metal salt of a hydroquinone and, where necessary, an alkali metal salt of any other dihydric phenol in the presence of a suitable solvent. In this reaction, there may be employed as a molecular weight modifier any of those compounds of the formula

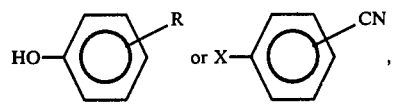

wherein R and X are as defined above.

The polycyanoaryl ether (C), which may be also employed as a film material in this invention, should contain not less than 80 molar % of the repeating unit (I''), preferably 90–100 molar %. If the content is less than 80 molar %, both heat resistance and mechanical strength tend to be lowered.

The polycyanoaryl ether (C) may be a copolymer containing the repeating unit (I'') and further less than 20 molar % of at least one of the repeating units represented by the formula

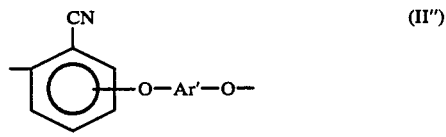 (II'')

wherein Ar' is a divalent aryl group other than

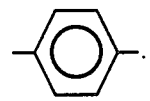

As examples of the Ar', there may be mentioned, for instance,

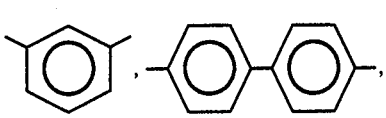

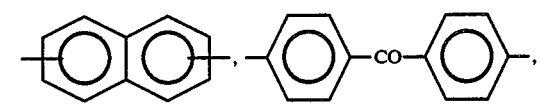

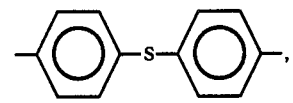

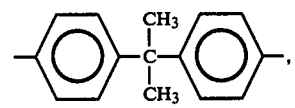

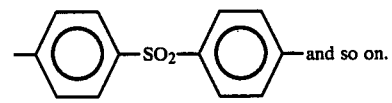 and so on.

If the repeating unit (II″) is involved at more than 20 molar %, the resultant molded film tends to lose its crystallizability and thus a satisfactory orientation effect would not be expected.

The polycyanoaryl ether stretched film of this invention is prepared by orientation of a molded film made of the above polycyanoaryl ether (A), (B) or (C).

More specifically, the polycyanoaryl ether is first molded to a film form. This step may be carried out according to a conventional method, e.g., hot press or melt extrusion. A molding temperature is not critical, but usually 360°–420° C., preferably 380°–410° C.

Then, the resultant molded film is subjected to orientation. In this step, there may be applied any of monoaxial orientation, simultaneous biaxial orientation and biaxial orientation after monoaxial orientation.

In this invention, it is essential in any of the above orientations that a drawing ratio should be not less than 1.5 times. Namely, in the case of monoaxial orientation, a length ratio to oriented direction should be 1.5 times or higher, while an area ratio should be not less than 1.5 times in the case of biaxial orientation. If less than 1.5 times, a sufficient mechanical strength could not be undesirably provided in the resultant stretched film. The drawing ratio is preferably 3–12 times for the polycyanoaryl ether (A), 3–6 times for the polycyanoaryl ether (B), and 3–12 times for the polycyanoaryl ether (C). A drawing temperature is usually approximately 220°–280° C., preferably 240°–270° C.

Moreover, it is preferable that the resultant oriented film may be stabilized by thermal fixing.

Thermal fixing may be desirably effected by keeping the stretched film under tension at a temperature higher than the stretching temperature applied and lower than a melting point of the film applied, e.g., 280°–340° C. for 1 second to 10 minutes.

The polycyanoaryl ether fiber of this invention is a melt-spun fiber being composed of (D) a polycyanoaryl ether containing not less than 80 molar % of the repeating unit represented by the above formula (I) and having a number-average molecular weight of 20,000–70,000 or the polycyanoaryl ether (B) as defined above or (E) a polycyanoaryl ether containing not less than 80 molar % of the repeating unit represented by the above formula (I″) and having a number-average molecular weight of 20,000–80,000 and having been stretched at a temperature below a melting point of said melt-spun fiber.

The polycyanoaryl ether (D), which may be employed as a fiber material in this invention, should contain the repeating unit (I) at not less than 80 molar %, preferably 90–100 molar %. If the content is less than 80 molar %, the polycyanoaryl ether fiber prepared therefrom as described below unsatisfactorily tends to show lowered strength and heat resistance.

The polycyanoaryl ether (D) may be the same copolymer as described above with regard to the polycyanoaryl ether (A).

Further, the polycyanoaryl ether (D) should also have a number-average molecular weight of 20,000–70,000, preferably 25,000–65,000.

If the number-average molecular weight is less than 20,000, the fiber does not show sufficient heat resistance and mechanical strength, while a homogeneous melt-spun fiber could not be formed if more than 70,000 and orientation of the fiber becomes difficult.

The polycyanoaryl ether (D) may have the same configuration and terminal group as set forth above with regard to the polycyanoaryl ether (A), (B) or (C).

The polycyanoaryl ether (D) may be readily prepared according to a conventional method, for instance, by the procedures as described above with regard the polycyanoaryl ether (A).

The polycyanoaryl ether (B), which may be also employed as a fiber material in this invention, is fully discussed hereinabove for the present film.

Particularly, if the repeating unit (I′) is contained at less than 50 molar %, the resulting fiber tends to show lowered heat resistance and mechanical strength. Also, if the reduced viscosity is less than 0.4 dl/g, both heat resistance and mechanical strength may be lowered, while a melt-spun fiber becomes difficult to be formed during the melt-spinning step due to a excessively high reduced viscosity if more than 2.0 dl/g.

The polycyanoaryl ether (E), which may be employed as a fiber material in this invention, should contain the repeating unit (I″) at not less than 80 molar %, preferably 90–100 molar %. If the content is less than 80 molar %, the polycyanoaryl ether fiber prepared therefrom as described below unsatisfactorily tends to show lowered strength and heat resistance.

The polycyanoaryl ether (E) may be the same copolymer as described above with regard to the polycyanoaryl ether (C).

Further, the polycyanoaryl ether (E) should also have a number-average molecular weight of 20,000–80,000, preferably 40,000–60,000.

The number-average molecular weight means as described above.

If the number-average molecular weight is less than 30,000, the fiber does not show sufficient heat resistance and mechanical strength, while a homogeneous melt-spun fiber could not be formed if more than 80,000 and orientation of the fiber becomes difficult.

The polycyanoaryl ether (E) may have the same configuration and terminal group as set forth above with regard to the polycyanoaryl ether (C).

The polycyanoaryl ether (E) may be readily prepared according to a conventional method, for instance, by the procedures as described above with regard the polycyanoaryl ether (C).

The polycyanoaryl ether fiber of this invention may be prepared according to a conventional method.

More specifically, the above-mentioned polycyanoaryl ether (B), (D) or (E) is first subjected to melt spinning. Melt spinning may be easily conducted by any conventional procedures. A melting temperature is usually 360°–420° C., preferably 370°–400° C., for the polycyanoaryl ether (D) and (E) and on the other hand 380°–440° C., preferably 390°–420° C. for the polycyanoaryl ether (B).

Then, the melt-spun fiber thus prepared is stretched or oriented. This stretching step should essentially be carried out at a temperature above a glass transition temperature of the polycyanoaryl ether applied and below a melting point or said melting temperature of said polycyanoaryl ether. If below said glass transition temperature, stretching could not be effected, while said polycyanoaryl ether may melt and it is not accomplished to enhance the strength of a melt-spun fiber through orientation if above said melting point. Generally, it is preferred to conduct the stretching step at 230°–270° C.

In this instance, a drawing ratio may be usually 2 times or higher, preferably 3-6 times, for a high level of mechanical strength.

This invention is further illustrated by way of the following Reference Example, Examples, Comparative Examples and Control Examples.

Preparative Example 1

Preparation of polycyanoaryl ethers (A)

In an autoclave with an inner volume of 5 liters were placed 232.5 g (1.25 moles) of 4,4'-biphenol, 215 g (1.25 moles) of 2,6-dichlorobenzonitrile, 207 g (1.5 moles) of potassium carbonate, 2.5 liters of sulfolane and 1.5 liters of toluene and reaction was conducted at 160° C. for 1.5 hours and then at 200° C. for a further 2 hours under argon stream. After completion of the reaction, a large volume of water was added to the reaction mixture to afford a powder of polycyanoaryl ethers. The resulting polymer was further washed with hot water and methanol and then dried. The polymer was obtained in a yield of 95% and had a number-average molecular weight of 40,000 and thermal properties of a glass transition temperature of 216° C., a melting point of 355° C. and a pyrolysis-starting temperature (in atmosphere) of 520° C. A number-average molecular weight was measured with a N-methylpyrrolidone solution of the resultant polycyanoaryl ether at a concentration of 70 mg/dl at 135° C. according to a high temperature gel permeation chromatography and determined in terms of polystyrene.

PREPARATION OF FILMS

Example 1

A polycyanoaryl ether powder having a number-average molecular weight of 40,000 prepared in the above-mentioned Preparative Example was subjected to melt extrusion, pelleting, vacuum drying and then press molding at 390° C. to produce a square, transparent molded film with a thickness of 0.3 mm and a side of 120 mm.

Then, the molded film was stretched at 260° C. to one way orientation at a free end, whereupon a drawing ratio was made to 4 times. Subsequently, the stretched film was thermally fixed under tension at 300° C. for one minute. The resultant stretched film was examined for its mechanical properties, namely breaking strength, elongation and modulus of elasticity.

Example 2

A polycyanoaryl ether powder having a number-average molecular weight of 27,000 prepared in the above-mentioned Preparative Example 1 except that the reaction was carried out for 60 minutes at 200° C. was pelleted to produce a molded film as done in Example 1. Then, the molded film was subjected to simultaneous biaxial orientation, whereupon a drawing ratio was made to twice in both longitudinal and lateral directions. Further, the biaxially oriented film was thermally fixed under tension at 300° C. for one minute. The resultant stretched film was examined for its mechanical properties as done in Example 1.

Example 3

Following the same procedures as in Example 2 except that there was employed a polycyanoaryl ether having a number-average molecular weight of 40,000 as prepared in the above Preparative Example 1, there was produced a simultaneously, biaxially oriented film and the resultant stretched film was examined for its mechanical properties.

Example 4

A polycyanoaryl ether having a number-average molecular weight of 45,000 as prepared in the same manner as in the above-mentioned Preparative Example 1 except that the reaction was carried out for 150 minutes at 200° C. was pelleted and then a molded film was produced. Subsequently, a biaxial orientation was made simultaneously in the same manner as in Example 2 except that a drawing ratio was made three times in both longitudinal and lateral directions and the resultant stretched film was examined for its mechanical properties.

Example 5

A polycyanoaryl ether having a number-average molecular weight of 62,000 as prepared in the same manner as in the above-mentioned Preparative Example 1 except that the reaction was carried out for 3 hours at 200° C. was pelleted and a molded film was produced. Subsequently, a biaxial orientation was made simultaneously in the same manner as in Example 2 except that a drawing ratio was made 2.5 times in both longitudinal and lateral directions and the resultant stretched film was examined for its mechanical properties.

Comparative Example 1

A polycyanoaryl ether having a number-average molecular weigtht of 15,000 prepared in the same manner as in the above-mentioned Preparative Example 1 except that the reaction was carried out for 1 hour at 200° C. was pelleted and a molded film was produced. However, the resultant molded film was so brittle that it could not be stretched.

Comparative Example 2

A polycyanoaryl ether having a number-average molecular weight of 66,000 prepared in the same manner as in the above-mentioned Preparative Example 1 except that the reaction was carried out for 200 min. at 200° C. was pelleted and a molded film was produced. Subsequently, the molded film was subjected to simultaneous biaxial orientation; however, the film showed so poor extensibility that a drawing ratio of over 1.2 times could not be obtained in both longitudinal and lateral directions. Subsequently, the resultant biaxially oriented film was examined for its mechanical properties.

Comparative Example 3

A polycyanoaryl ether with a number-average molecular weigtht of 70,000 was prepared in the same manner as in the above-mentioned Preparative Example 1 except that the reaction was carried out for 210 min. at 200° C. Then, the polymer in the form of pellets was hot-pressed so that a homogeneous molded film could not be formed.

Reference Example 1

A polycyanoaryl ether with a number-average molecular weight of 40,000 was prepared in the same manner as in the above-mentioned Preparative Example and an unstretched film was prepared. Then, the film was examined for its mechanical properties.

The results of the above Examples are summarized in the following Table 1.

TABLE 1

|  | Number-average molecular weight of polycyanoaryl ether | Drawing ratio (times) | Breaking strength (kg/mm$^2$) | Elongation (%) | Modulus of elasticity (kg/mm$^2$) |
| --- | --- | --- | --- | --- | --- |
| Example 1 | 40,000 | 4 | 34 | 40 | 550 |
| Example 2 | 27,000 | 2 × 2 | 15 | 20 | 390 |
| Example 3 | 40,000 | 2 × 2 | 17 | 45 | 410 |
| Example 4 | 45,000 | 3 × 3 | 21 | 45 | 440 |
| Example 5 | 62,000 | 2.5 × 2.5 | 20 | 30 | 450 |
| Comparative Example 2 | 66,000 | 1.2 × 1.2 | 12 | 40 | 310 |
| Reference Example 1 | 40,000 | — | 11 | 40 | 270 |

Example 6

Into an autoclave having an inner volume of 5 liters and stirring means were placed 397 g (2.48 moles) of 2,7-dihydroxynaphthalene, 430 g (2.5 moles) of 2,6-dichlorobenzonitrile, 414 g (3.0 moles) of potassium carbonate, 2.5 liters of sulfolane, and 1.5 liters of toluene and reaction was carried out at 160° C. for 1.5 hours and then at 200° C. for further 1.5 hours under argon stream. After completion of the polymerization reaction, a large volume of water was added to the reaction mixture, thereby separating a granular polymer. The resultant polymer was recovered and washed three times with 3 liters of hot water and once with 3 liters of methanol to produce a polycyanoaryl ether having 100% of a repeating unit of the formula

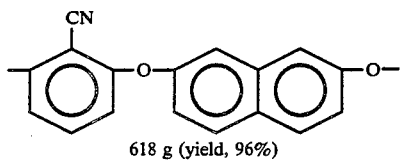

618 g (yield, 96%)

The resultant polymer was measured for its reduced viscosity [η sp/c] in a 0.2 g/dl solution in p-chlorophenol at 60° C. The results are summarized in the following Table 2.

Also, the polymer was confirmed to have thermal properties, namely, a glass transition temperature of 215° C., a melting point of 345° C. and a thermal decomposition-starting temperature (in atmosphere) of 505° C. so that it possesses a practically acceptable heat resistance.

Then, the polymer showed such solvent resistance as insolubility in solvents, i.e., acetone, ethanol, toluene, methylene chloride, and chloroform.

The polymer was pelleted by melt extrusion and the resultant pellet after vacuum dried was press-molded to form a transparent film with 120 mm × 120 mm and a thickness of 0.3 mm.

The resultant film was simultaneously subjected to biaxial orientation so that a drawing ratio was three times in both longitudinal and lateral directions.

Subsequently, the stretched film was thermally fixed by keeping at 300° C. for 1 minute under tension. The resulting film was measured for mechanical properties, namely, breaking strength, elongation and modulus of elasticity. The results are also summarized in the following Table 2.

Examples 7–10

Following the same procedured as in Example 6 except that various reaction times were employed at 200° C., there were prepared polycyanoaryl ethers having reduced viscosity as indicated in the following Table 2.

Then, stretched films were formed from the ethers in the same manner as in Example 6 except that drawing ratios were as indicated in the following Table 2. The resultant polymer showed good heat resistance, flame retardancy and solvent resistance as seen in Example 6.

Example 11

Following the same procedures as in Example 6 except that a mixture of 238.3 kg (1.49 moles) of 1,5-dihydroxynaphthalene and 184.5 g (0.99 mole) of 4,4'-biphenol was used instead of the 2,7-dihydroxynaphthalene (397 g), there was prepared a polycyanoaryl ether.

The resultant ether contained 60 molar % of a repeating unit having the formula

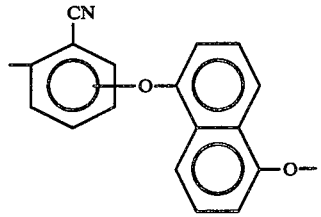

and 40 molar % of a repeating unit having the formula

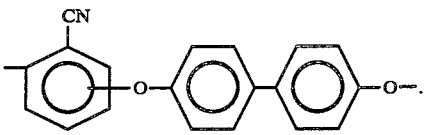

The resultant copolymer was confirmed to show thermal properties, namely, a glass transition temperature of 221° C., a melting point of 302° C., a thermal decomposition-starting temperature (in atmosphere) of 519° C. and possess a practically acceptable heat resistance.

Then, a stretched film was formed from the copolymer in the same manner as in Example 6 except that a drawing ratio was two times in both longitudinal and lateral directions.

The resulting film was measured for properties in the same manner as in Example 6 and similar results to those of Example 6 could be obtained with regard to solvent resistance and flame retardancy.

Comparative Example 4

A polycyanoaryl ether having a reduced viscosity of 0.34 dl/g was prepared by employing a shortened polymerization time at 200° C. in Example 6. The polymer was formed into a press film in the same manner as in Example 6. The resultant film was subjected to biaxial orientation in the same manner as in Example 6; however, the film was so brittle as not to be stretched.

Comparative Example 5

A polycyanoaryl ether having a reduced viscosity of 2.10 dl/g was prepared in the same manner as in Example 6 except that a more prolonged ploymerization time at 200° C. was employed than that in Example 6. The resultant film was press-molded in the same manner as in Example 6; however, a homogeneous film could not be obtained. Biaxial orientation of the film could not provide a uniform elongation and thus a practically inferior film could only be obtained.

Reference Example 2

The press film as produced in Example 6 (not stretched) was measured for mechanical properties. The results are also summarized in the following Table 2.

TABLE 2

| | Reduced viscosity of polymer [sp/c] (dl/g) | Drawing ratio (longitudinal × lateral) | Breaking strength (kg/mm²) | Elongation (%) | Modulus of elasticity (kg/mm²) |
|---|---|---|---|---|---|
| Example 6 | 0.93 | 3.0 × 3.0 | 28 | 15 | 640 |
| Example 7 | 0.60 | 2.0 × 2.0 | 19 | 25 | 450 |
| Example 8 | 0.80 | 3.5 × 3.5 | 27 | 10 | 660 |
| Example 9 | 1.10 | 2.5 × 2.5 | 21 | 15 | 460 |
| Example 10 | 1.43 | 1.5 × 1.5 | 20 | 15 | 420 |
| Example 11 | 1.52 | 2.0 × 2.0 | 22 | 10 | 520 |
| Comparative Example 4 | 0.34 | 1.5 × 1.5 | | Not stretchable | |
| Comparative Example 5 | 2.10 | — | | Not measurable | |
| Reference Example 2 | 0.93 | — | 14 | 45 | 320 |

Preparative Example 2

Preparation of polycyanoaryl ethers (C)

In an autoclave with an inner volume of 5 liters were placed 136 g (1.24 moles) of hydroquinone, 215 g (1.25 moles) of 2,6-dichlorobenzonitrile, 207 g (1.5 moles) of potassium carbonate, 2.5 liters of sulfolane and 1.5 liters of toluene and reaction was conducted at 160° C. for 1.5 hours and then at 200° C. for a further 2 hours under argon stream. After completion of the reaction, a large volume of water was added to the reaction mixture to afford a powder of polycyanoaryl ethers. The resulting polymer was further washed with hot water and methanol and then dried. The polymer was obtained in a yield of 95% and had a number-average molecular weight of 44,000 and thermal properties of a glass transition temperature of 180° C., a melting point of 340° C. and a thermal decomposition-starting temperature (in atmosphere) of 520° C. A number-average molecular weight was 44,000.

Example 12

A polycyanoaryl ether powder having a number-average molecular weight of 44,000 prepared in the above-mentioned Preparative Example 2 was subjected to melt extrusion, pelleting, vacuum drying and then press molding at 390° C. to produce a square, transparent molded film with a thickness of 0.3 mm and a side of 120 mm.

Then the molded film was stretched at 210° C. to one way orientation at a free end, whereupon a drawing ratio was made to 4 times. Subsequently, the stretched film was thermally fixed under tension at 300° C. for one minute. The resultant stretched film was examined for its mechanical properties, namely breaking strength, elongation and modulus of elasticity.

Example 13

Following the same procedures as in Preparative example 2 and Example 12 except that reaction was carried out for 100 min. at 200° C., a polycyanoaryl ether pellet having a number-average molecular weight of 38,000 was prepared and then press-molded at 390° C. to produce a square, transparent molded film with a thickness of 0.3 mm and a side of 120 mm. Then, the molded film was stretched at 220° C. simultaneously to biaxial directions, whereupon a drawing ratio was made to 2.5 times in both longitudinal and lateral direction.

Further, the biaxially oriented film was thermally fixed under tension at 260° C. for one minute. The resultant stretched film was examined for its mechanical properties.

Example 14

A polycyanoaryl ether having a number-average molecular weight of 44,000 as prepared in the same manner as in the above-mentioned Preparative Example 2 except that the reaction was carried out for 150 min. at 200° C. was pelleted and then a molded film was produced. Subsequently, a biaxial orientation was made simultaneously in the same manner as in Example 13 except that a drawing ratio was made three times in both longitudinal and lateral directions and the resultant stretched film was examined for its mechanical properties.

Example 15

A polycyanoaryl ether having a number-average molecular weight of 49,000 as prepared in the same manner as in the above-mentioned Preparative Example 2 except that the reaction was carried out for 160 min. at 200° C. was pelleted and a molded film was produced. Subsequently, a biaxial orientation was made simultaneously in the saSme manner as in Example 2 except that a drawing ratio was made 4 times in both longitudinal and lateral directions and the resultant stretched film was examined for its mechanical properties.

Example 16

A polycyanoaryl ether powder having a number-average molecular weight of 57,000 prepared in the above-mentioned Preparative Example 2 except that the reaction was carried out for 3 hours at 200° C. was pelleted to produce a molded film as done in Example 13. Then, the molded film was subjected to simultaneous biaxial orientation, whereupon a drawing ratio was made to twice in both longitudinal and lateral directions in the same manner as in Example 13. The resultant stretched film was examined for its mechanical properties as done in Example 1.

Comparative Example 6

A polycyanoaryl ether having a number-average molecular weight of 24,000 prepared in the same manner as in the above-mentioned Preparative Example 2 except that the reaction was carried out for 50 minutes at 200° C. was pelleted and a molded film was produced. However, the resultant molded film was so brittle that it could not be stretched.

Comparative Example 7

A polycyanoaryl ether having a number-average molecular weight of 28,000 prepared in the same manner as in the above-mentioned Preparative Example 2 except that the reaction was carried out for an hour at 200° C. was pelleted and a molded film was produced. The resultant film was subjected to biaxial orientation in the same manner as in Example 13, however, the film was so brittle as to be stretched only 1.2 times in both directions.

Comparative Example 8

A polycyanoaryl ether with a number-average molecular weight of 95,000 was prepared in the same manner as in the above-mentioned Preparative Example except that the reaction was carried out for 210 minutes at 200° C. Then, the polymer in the form of pellets was hot-pressed so that a homogeneous molded film could not be formed.

Reference Example 3

A polycyanoaryl ether with a number-average molecular weight of 44,000 was prepared in the same manner as in the above-mentioned Preparative Example 2 and an unstretched film was prepared. Then, the film was examined for its mechanical properties.

The results of the above Examples are summarized in the following Table 3.

PREPARATION OF FIBERS

Example 17

Into a separable flask with an inner volume of 5 liters were placed 215 g (1.25 moles) of 2,6-dichlorobenzonitrile, 232 g (1.25 moles) of 4,4'-biphenol, 207 g (1.5 moles) of potassium carbonate, 2.5 liters of sulfolane and 1.5 liters of toluene and reaction was carried out at 160° C. for 1.5 hours, and then at 200° C. for 1 hour and 40 minutes, while bubbled with argon gas. Then, the reaction mixture was poured into methanol to separate out a polymer. The resultant polymer was washed five times with 5 liters of hot water and then twice with 5 liters of methanol and dried to give 350 g of a polycyanoaryl ether.

The resultant polymer was measured for a number-average molecular weight in terms of a polystyrene according to a high temperature gel permeation chromatography (at a temperature of 135° C. as measured) of a 70 mg/dl solution in N-methylpyrrolidone. The results are shown in the following Table 4.

Also, the polymer was confirmed to show thermal properties, namely, a glass transition temperature of 220° C., a melting point of 355° C. and a thermal decomposition-starting tamperature (in atmosphere) of 540° C. and possess a practically acceptable heat resistance.

Then, the polymer showed a solvent resistance, i.e., insolubility in acetone, ethanol, toluene, methylene chloride and chloroform.

The polymer was exposed to the flame of a cigarette lighter for 10 seconds and then the flame was removed so that fire instantly went out without any melt dropping, which showed a good flame retardancy.

The polymer was subjected to melt spinning through a nozzle with a bore diameter of 0.5 mm at 390° C., elongated to 10 times, cooled with water and then stretched at 250° C. with a drawing ratio of 3.0.

The polycyanoaryl ether fiber thus prepared had mechanical strength as indicated in the following Table 4, namely, tensile strength, elongation and modulus of elastisity. In Table 4, a number-average molecular weight of the polymer, fiber diameters before and after elongation and a drawing ratio are also shown.

Examples 18–21

Following the same procedures as in Example 17 except that a prolonged reaction time at 200° C. was employed, there were produced polycyanoaryl ethers having the number-average molecular weights indicated in Table 4. The ethers were subjected to melt spinning and elongation as in Example 17 with varied drawing ratios.

Various properties were measured in the same manner as in Example 17 and similar results to those of

TABLE 3

|  | Number-average molecular weight of polycyanoaryl ether | Drawing ratio (times) | Breaking strength (kg/mm$^2$) | Elongation (%) | Modulus of elasticity (kg/mm$^2$) |
| --- | --- | --- | --- | --- | --- |
| Example 12 | 44,000 | 4 | 47 | 25 | 680 |
| Example 13 | 38,000 | 2.5 × 2.5 | 21 | 60 | 390 |
| Example 14 | 44,000 | 3 × 3 | 24 | 60 | 460 |
| Example 15 | 49,000 | 4 × 4 | 27 | 50 | 600 |
| Example 16 | 57,000 | 2 × 2 | 19 | 35 | 420 |
| Comparative Example 7 | 28,000 | 1.2 × 1.2 | 13 | 5 | 350 |
| Reference Example 3 | 44,000 | — | 13 | 40 | 280 |

Example 17 were obtained with repard to thermal properties, flame retardancy and solvent resistance. The results for mechanical properties are also shown in Table 4.

Comparative Example 9

Following the same procedures as in Example 17 except that a shortened reaction time at 200° C. was employed, there was produced a polycyanoaryl ether having a number-average molecular weight of 15,000. Then, the polymer was melt-spinned as in Example 17 and stretched with a drawing ratio of 3.0; however, fiber was broken during stretching and mechanical strength of the fiber could not be measured.

Comparative Example 10

Following the same procedures as in Example 17 except that a more prolonged reaction time at 200° C. was employed than that of Example 17, there was prepared a polycyanoaryl ether having a numger-average molecular weight of 72,000. Then, the polymer was melt-spinned as in Example 17; however, fibers with a uniform yarn diameter could not be obtained and subsequent stretching was difficult.

Reference Example 4

Melt-spinned fibers of the polycyanoaryl ether having a number-average molecular weight of 40,000 as prepared in Example 18 (not stretched) were measured for mechanical strength. The results are also shown in Table 4.

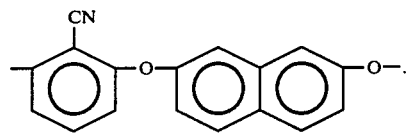

The resultant polymer was measured for a reduced viscosity [ηsp/c] in a 0.2 g/dl solution in p-chlorophenol at 60° C. The results are summarized in the following Table 5.

The polymer was confirmed to show thermal properties, namely, a glass transition temperature of 215° C., a melting point of 345° C. and a thermal decomposition-starting temperature (in atmosphere) of 505° C. and thus have a practically acceptable heat resistance.

Then, the polymer showed a solvent resistance, i.e., insolubility in acetone, ethanol, toluene, methylene chloride and chloroform.

The polymer was exposed to the flame of a cigarette lighter for 10 seconds and then the flame was removed so that fire instantly went out without any melt dropping, which showed a good flame retardancy.

The polymer was subjected to melt spinning through a nozzle with a bore diameter of 0.5 mm at 410° C., elongated to 10 times, cooled with water and then stretched at 250° C. with a drawing raio of 3.0.

The polycyanoaryl ether fiber thus prepared had mechanical strength as indicated in the following Table 5, namely, tensile strength, elongation and modulus of elastisity. A reduced viscosity of the poSlyer, fiber

TABLE 4

| | Number-average molecular weight | Fiber diameter (μm) Before elongation | After elongation | Drawing ratio | Tensile strength (kg/mm²) | Elongation (%) | Modulus of elasticity (kg/mm²) |
|---|---|---|---|---|---|---|---|
| Example 17 | 25,000 | 52 | 17 | 3.0 | 29 | 20 | 470 |
| Example 18 | 40,000 | 50 | 20 | 2.5 | 32 | 35 | 490 |
| Example 19 | 40,000 | 50 | 10 | 5.0 | 42 | 15 | 590 |
| Example 20 | 44,000 | 48 | 16 | 3.0 | 34 | 30 | 490 |
| Example 21 | 63,000 | 52 | 23 | 2.3 | 32 | 30 | 500 |
| Comparative Example 9 | 15,000 | — | — | 3.0 | Not measurable owing to breaking | | |
| Comparative Example 10 | 72,000 | Not measurable owing to difficult elongation from non-uniform fiber diameters | | | | | |
| Reference Example 4 | 40,000 | 50 | — | — | 20 | 40 | 350 | diameters before and after elongation and a drawing ratio are also shown in Table 5.

Examples 23-26

Following the same procedures as in Example 22 except that reaction time at 200° C. was changed, there were produced polycyanoaryl ethers having the indicated number-average molecular weight in Table 5. The ethers were subjected to melt spinning and elongation as in Example 22 with varied drawing ratios.

Various properties were measured in the same manner as in Example 22 and similar results to those of Example 22 were obtained with regard to thermal properties, flame retardancy and solvent resistance. The results for mechanical properties are also shown in Table 5.

Example 27

Following the same procedures as in Example 22 except that a mixture of 120.0 g (0.75 mole) of 1,5-dihydroxynaphthalene and 92.9 g (0.50 mole) of 4,4'-

Example 22

Into a separable flask with an inner volume of 3 liters were placed 215 g (1.25 moles) of 2,6-dichlorobenzonitrile, 200 g (1.248 moles) of 2,7-dihydroxynaphthalene, 207 g (1.5 moles) of potassium carbonate, 1.25 liters of sulfolane and 0.75 liter of toluene and reaction was carried out at 160 °C. for 1.5 hours, and then at 200 ° C. for a further 1.5 hours, while bubbled with argon gas. After completion of the reaction, the reaction mixture was poured into methanol to separate out a polymer. The polymer was washed five times with 3 liters of hot water and then twice with 3 liters of methanol to give 320 g of a polycyanoaryl ether having 100 molar % of a repeating unit of the formula biphenol was employed instead of the 2,7-dihydroxynaphthalene (200 g), there was prepared a polycyanoaryl ether. The ether had 60 molar % of a repeating unit of the formula

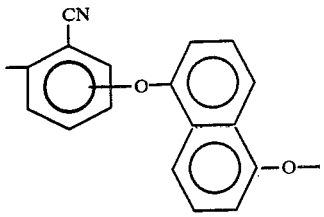

and 40 molar % of a repeating unit of the formula

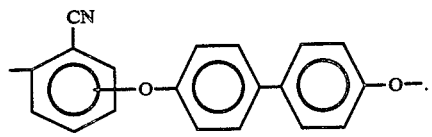

The resultant copolymer was confirmed to show thermal properties, namely, a glass transition temperature of 211° C., a melting point of 302° C. and a thermal decomposition-starting temperature (in atmosphere) of 519° C. and thus have a practically acceptable heat resistance.

The resulting copolymer showed similar solvent resistance and flame retardance to those in Example 22.

In the same manner as in Example 22, the copolymer was melt-spinned and stretched. The results of measurements are shown in Table 5.

Comparative Example 11

Following the same procedures as in Example 22 except that a shortened reaction time was employed at 200° C., there was prepared a polycyanoaryl ether with a reduced viscosity of 0.34 dl/g.

Then, the polymer was melt-spinned as in Example 22 and stretched with a drawing ratio of three times; however, fibers were broken during stretching and mechanical properties of the fibers could not be measured.

Comparative Example 12

Following the same procedures as in Example 22 except that a more prolonged polymerization time at 200° C. was employed than that of Example 22, there was prepared a polycyanoaryl ether with a reduced viscosity of 2.10 dl/g. Then, the polymer was melt-spinned as in Example 22 so that non-uniformity in spinning was remarkable, fibers with a uniform yarn diameter was not available and subsequent stretching was difficult.

Reference Example 5

Melt-spinned fibers of the polycyanoaryl ether as prepared in Example 22 (not stretched) were measured for mechanical properties. The results are also shown in Table 5.

TABLE 5

| | Reduced viscosity of polymer (dl/g) | Fiber diameter (μm) Before elongation | Fiber diameter (μm) After elongation | Drawing ratio (times) | Tensile strength (kg/mm²) | Elongation (%) | Modulus of elasticity (kg/mm²) |
|---|---|---|---|---|---|---|---|
| Example 22 | 0.93 | 53 | 13 | 4.0 | 45 | 10 | 800 |
| Example 23 | 0.60 | 51 | 17 | 3.0 | 38 | 10 | 510 |
| Example 24 | 0.80 | 54 | 11 | 5.0 | 47 | 5 | 780 |
| Example 25 | 1.10 | 58 | 23 | 2.5 | 25 | 15 | 470 |
| Example 26 | 1.43 | 50 | 24 | 2.0 | 24 | 10 | 410 |
| Example 27 | 1.52 | 55 | 15 | 4.0 | 40 | 10 | 600 |
| Comparative Example 11 | 0.34 | — | — | 3.0 | Not measurable owing to breaking | | |
| Comparative Example 12 | 2.10 | Not measurable owing to difficult elongation from non-uniform fiber diameters | | | | | |
| Reference Example 5 | 0.93 | 53 | — | — | 18 | 25 | 360 |

Example 28

Into an autoclave having an inner volume of 5 liters and stirring means were placed 136.3 g of hydroquinone, 215 g of 2,6-dichlorobenzonitrile, 207 g of potassium carbonate, 2.5 liters of sulfolane, and 1.5 liters of toluene and reaction was carried out at 160° C. for 1 hour and then at 200° C. for further 110 min. under argon stream. After completion of the polymerization reaction, a large volume of water was added to the reaction mixture, thereby separating a granular polymer. The resultant polymer was recovered and washed three times with 3 liters of hot water and once with 3 liters of methanol to produce a polycyanoaryl ether having 100% of a repeating unit of the formula

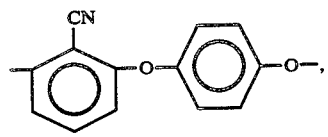

and a polymer yield was 240 g.

The resultant polymer was measured for its reduced viscosity [ηsp/c] in a 0.2 g/dl solution in p-chlorophenol at 60° C.

Also, the polymer was confirmed to have thermal properties, namely, a glass transition temperature of 180° C., a melting point of 340° C. and a thermal decomposition-starting temperature (in atmosphere) of 530° C. so that it possesses a practically acceptable heat resistance.

Then, the polymer showed such solvent resistance as insolubility in solvents, i.e., acetone, ethanol, toluene, methylene chloride, and chloroform.

The polymer was subjected to melt spinning through a nozzle with a bore diameter of 0.5 mm at 390° C., elongated to 10 times, cooled with water and then stretched at 210° C. with a drawing ratio of 3.0.

The polycyanoaryl ether fiber thus prepared had mechanical strength as indicated in the following Table 6, namely, tensile strength, elongation and modulus of elastisity. In Table 6, a number-average molecular weight of the polymer, fiber diameters before and after elongation and a drawing ratio are also shown.

Examples 29, 30 and 31

Following the same procedures as in Example 28 except that the reaction was carried out for 2 hours at 200° C., there were produced polycyanoaryl ethers having the number-average molecular weights of 44,000. The ethers were subjected to melt spinning and elongation as in Example 28 with varied drawing ratios.

The results for mechanical properties are shown in Table 3.

Example 32

Following the same procedures as in Example 28 except that The reaction was carried out for 150 min. at 200° C., there was produced polycyanoaryl ethers having the number-average molecular weights of 57,000. The polymer was subjected to melt spinning and elongation as in Example 28 with 3 times drawing ratio.

The result for mechanical properties are shown in Table 6.

Comparative Example 13

Following the same procedures as in Example 28 except that The reaction was carried out for an hour at 200° C., there was produced a polycyanoaryl ether haivng a number-average molecular weight of 28,000. Then, the polymer was melt-spinned as in Example 28 and stretched with a drawing ratio of 3.0.

A uniform fiber was not obtained so that the mechanical strength could not be measured.

Comparative Example 14

Following the same procedures as in Example 28 except that a reaction was carried out for 3 hours at 200° C., there was prepared a polycyanoaryl ether having a number -average molecular weight of 82,000. Then, the polymer was melt-spinned as in Example 28; however, fibers with a uniform yarn diameter could not be obtained and subsequent stretching was difficult.

Reference Example 6

Melt-spinned fibers of the polycyanoaryl ether having a number-average molecular weight of 40,000 as prepared in Example 28 (not stretched) were measured for mechanical strength. The results are also shown in Table 6.

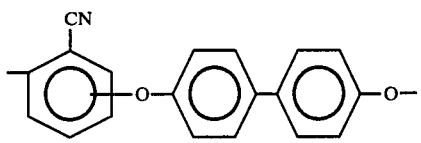

and having a number-average molecular weight of 25,000–65,000, (B) a polycyanoaryl ether containing not less than 50 molar % of a repeating unit represented by the formula

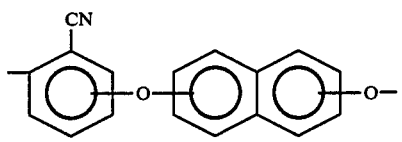

and having a reduced viscosity of 0.4–2.0 dl/g at 60° C. in a solution of a concentration of 0.2 g/dl in p-chlorophenol or (C) a polycyanoaryl ether containing not less than 80 molar % of a repeating unit represented by the formula CN

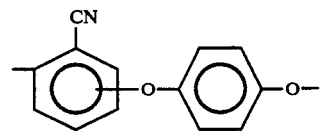

and having a number-average molecular weight of 30,000–90,000, and having been stretched at a drawing ratio of not less than 1.5 times.

2. A polycyanoaryl ether stretched film as claimed in claim 1 wherein said polycyanoaryl ether (A) is a copolymer containing said repeating unit (I) and not more than 20 molar % of at least one of repeating units represented by

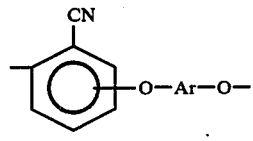

wherein Ar is a divalent aryl group other than

TABLE 6

|  | Number-average molecular weight | Fiber diameter (μm) | | Drawing ratio | Tensile strength (kg/mm²) | Elongation (%) | Modulus of elasticity (kg/mm²) |
| --- | --- | --- | --- | --- | --- | --- | --- |
|  |  | Before elongation | After elongation |  |  |  |  |
| Example 28 | 39,000 | 51 | 18 | 3.0 | 32 | 12 | 490 |
| Example 29 | 44,000 | 48 | 23 | 2.0 | 30 | 15 | 510 |
| Example 30 | 44,000 | 48 | 17 | 3.0 | 38 | 23 | 560 |
| Example 31 | 44,000 | 48 | 11 | 4.0 | 49 | 20 | 660 |
| Example 32 | 57,000 | 46 | 18 | 3.0 | 35 | 15 | 460 |
| Comparative Example 13 | 28,000 | 42 | 15 | 3.0 | not constant |  |  |
| Comparative Example 14 | 82,000 | — | — | — | — |  |  |
| Reference Example 6 | 44,000 | 48 | — | 0.0 | 25 | 30 | 390 |

What is claimed is:

1. A polycyanoaryl ether stretched film which comprises a molded film being composed of (A) a polycyanoaryl ether containing not less than 80 molar % of a repeating unit represented by the formula

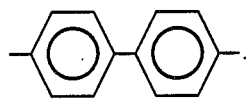

3. A polycyanoaryl ether stretched film as claimed in claim 1 wherein said polycyanoaryl ether (B) is a copolymer containing said repeating unit (I') and less than 50 molar of at least one of repeating units represented by the formula

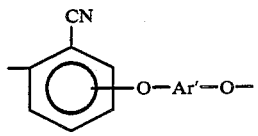

wherein Ar' is a divalent aryl group other than

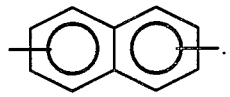

4. A polycyanoaryl ether stretched film as claimed in claim 1 wherein said polycyanoaryl ether (C) is a copolymer containing said repeating unit (I'') and not more than 20 molar % of at least one of repeating units represented by

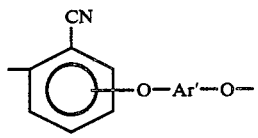

wherein Ar' is a divalent aryl group other than

5. A polycyanoaryl ether film as claimed in claim 1 wherein said polycyanoaryl ether (A) has a number-average molecular weight of 35,000 to 60,000.

6. A polycyanoaryl ether film as claimed in claim 1 wherein said polycyanoaryl ether (B) has a reduced viscosity of 0.6–1.5 dl/g.

7. A polycyanoaryl ether film as claimed in claim 1 wherein said polycyanoaryl ether (C) has a number-average molecular weight of 35,000–60,000.

8. A polycyanoaryl ether fiber which comprises a melt-spinned fiber being composed of (D) a polycyanoaryl ether containing not less than 80 molar % of a repeating unit represented by the formula

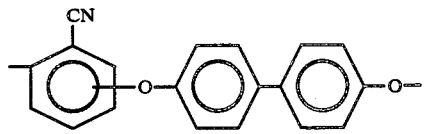

and having a number-average molecular weight of 20,000 to 70,000, (B) a polycyanoaryl ether containing not less than 50 molar % of a repeating unit represented by the formula

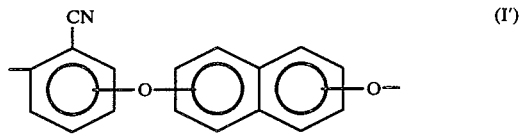

and having a reduced viscosity of 0.4–2.0 dl/g at 60° C. in a solution of a concentration of 0.2 g/dl in p-chlorophenol or (E) a polycyanoaryl ether containing not less than 80 molar % of a repeating unit represented by the formula

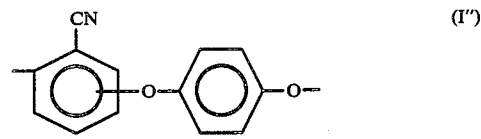

and having a number-average molecular weight of 30,000–80,000, and having been stretched at a temperature below a melting temperature of said fiber.

9. A polycyanoaryl ether fiber as claimed in claim 8 wherein said polycyanoaryl ether (D) is a copolymer containing said repeating unit (I) and not more than 20 molar % of at least one of repeating units represented by the formula

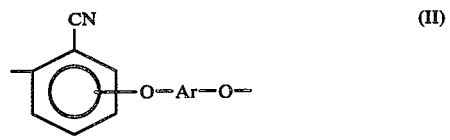

wherein Ar is a divalent aryl group other than

10. A polycyanoaryl ether fiber as claimed in claim 8 wherein said polycyanoaryl ether (B) is a copolymer containing said repeating unit (I') and less than 50 molar of at least one of repeating units represented by the formula

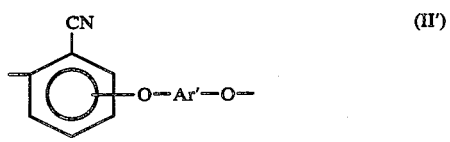

wherein Ar' is a divalent aryl group other than

11. A polycyanoaryl ether fiber as claimed in claim 8 wherein said polycyanoaryl ether (E) is a copolymer containing said repeating unit (I'') and not more than 20 molar % of at least one of repeating units represented by the formula

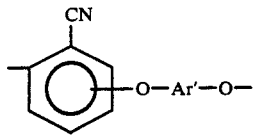

wherein Ar' is a divalent aryl group other than

12. A polycyanoaryl ether fiber as claimed in claim 8 wherein said polycyanoaryl ether (D) has a number-average molecular weight of 25,000 to 65,000.

13. A polycyanoaryl ether fiber as claimed in claim 8 wherein said polycyanoaryl ether (B) has a reduced viscosity of 0.6–1.5 dl/g.

14. A polycyanoaryl ether fiber as claimed in claim 8 wherein said polycyanoaryl ether (E) has a number-average molecular weight of 20,000 to 80,000.

15. A polycyanoaryl ether fiber as claimed in claim 8 wherein said drawing ratio is not less than 2 times.

* * * * *